(No Model.) 2 Sheets—Sheet 1.

F. CROMPTON.
APPARATUS FOR MAKING GARMENT STAYS.

No. 461,012. Patented Oct. 13, 1891.

Witnesses.
Lewis P. Abell.
A. B. Monkhouse.

Inventor.
Frederick Crompton.
by Fetherstonhaugh & Co.
Attys.

(No Model.) 2 Sheets—Sheet 2.

F. CROMPTON.
APPARATUS FOR MAKING GARMENT STAYS.

No. 461,012. Patented Oct. 13, 1891.

Witnesses.
Lewis P. Abell.
A. B. Monkhouse.

Inventor.
Frederick Crompton
by
Fetherstonhaugh & Co.
Attys.

UNITED STATES PATENT OFFICE.

FREDERICK CROMPTON, OF TORONTO, CANADA.

APPARATUS FOR MAKING GARMENT-STAYS.

SPECIFICATION forming part of Letters Patent No. 461,012, dated October 13, 1891.

Application filed June 27, 1891. Serial No. 397,695. (No model.)

*To all whom it may concern:*

Be it known that I, FREDERICK CROMPTON, manufacturer, of the city of Toronto, in the county of York, in the Province of Ontario, Canada, have invented a certain new and useful Machine for Making Garment-Stays, of which the following is a specification.

My invention relates more particularly to the means for securing the blades to the covering material by a suitable paste.

The object of the invention is, first, to furnish a machine by which the blades which form the resilient element of the stay may be perfectly spaced in one layer of the covering material without any liability of the pasted material adhering to any part of the machine; secondly, to provide a ready means for transferring the material with blades adhering thereto without any liability of displacing the blades, and, thirdly, to provide a simple device by which the machine may be made to accommodate different lengths of blades and widths of material.

Figure 1:
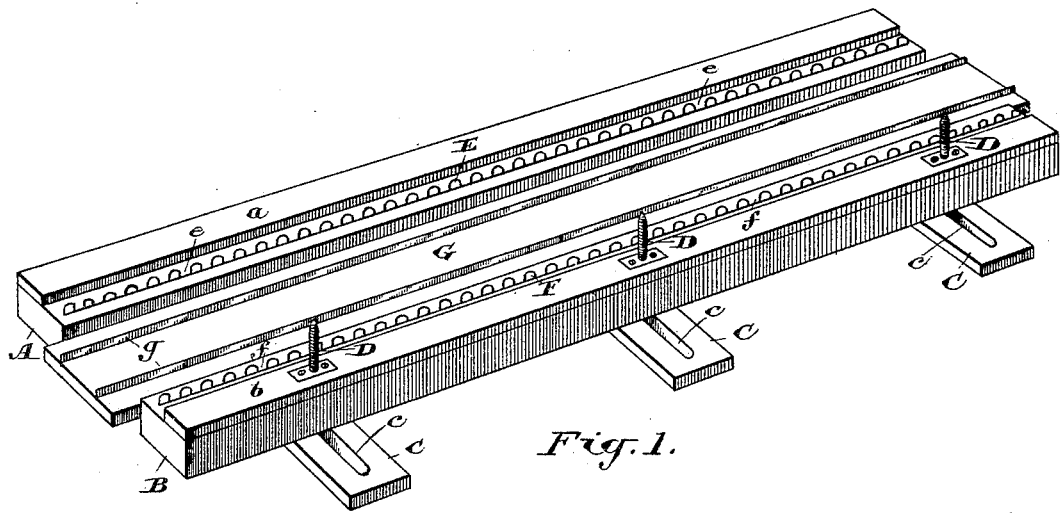
Figure 2:
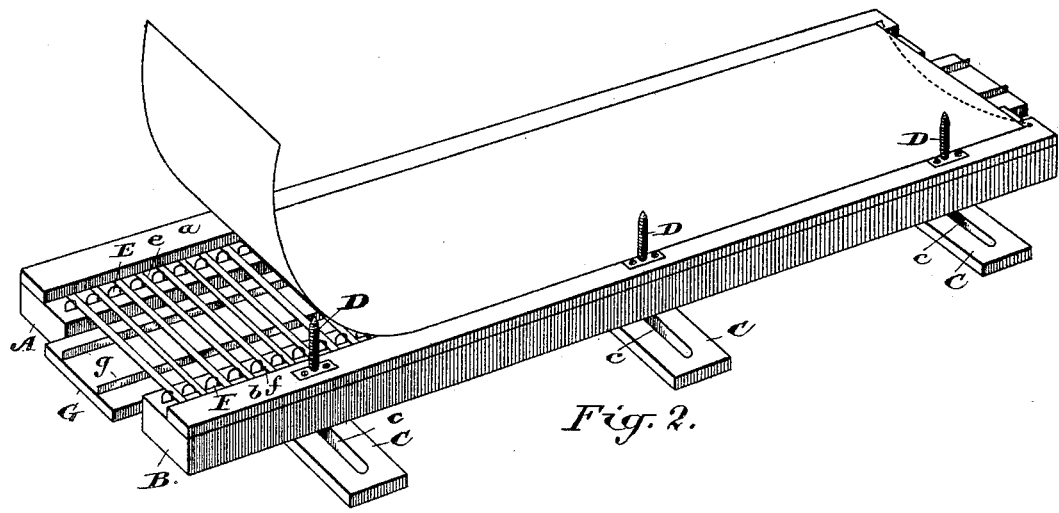
Figure 3:
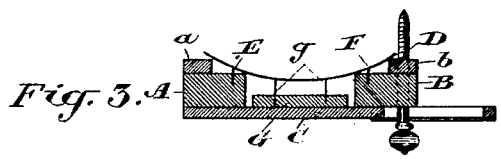
Figure 4:
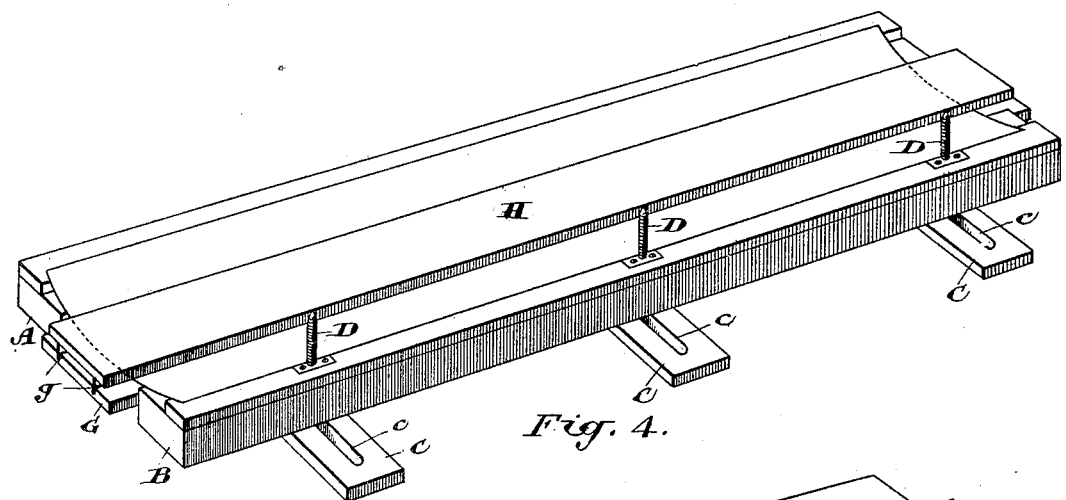
Figure 5:
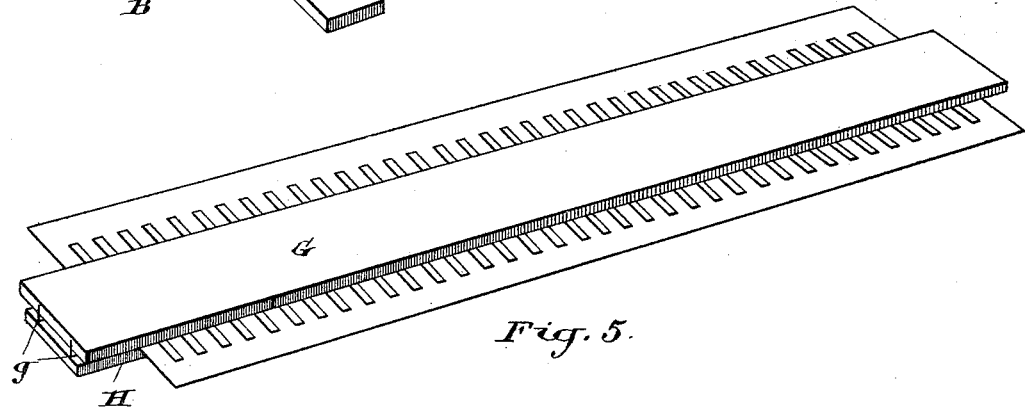
Figure 6:
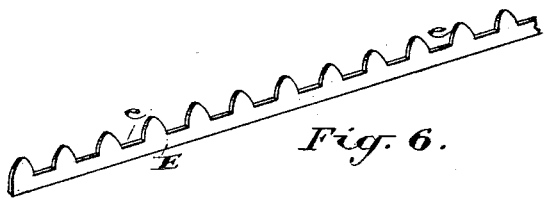

Figure 1 is a perspective view of my machine ready for use. Fig. 2 is a similar view showing the blades and material in place. Fig. 3 is a cross-section showing the position of blades and material when the material is being rubbed so as to cause the blades to adhere to it. Fig. 4 is a view showing the material ready to be removed. Fig. 5 is a view showing the material removed and reversed, showing blades up. Fig. 6 is a detail of notched strip.

In the drawings like letters of reference indicate corresponding parts in each figure.

A and B are the side bars, and $a$ and $b$ back stops secured at the top of each.

C are the cross-bars, which are secured at the bottom of the bars A and B. It will be noticed on reference to Fig. 3 that I cut a slot $c$ in each of the cross-bars C below the side bar B and provide thumb-screws D, which extend upwardly through said slots into the side bar B. By loosening the screws D the side bar B may be moved laterally to any desired position on the cross-bars C, this of course depending on the length of the blades used, and secured there by tightening the said thumb-screws D.

E and F are metal strips secured edge up in the side bars A and B, near their inner edges, and extending throughout their entire length. The metal strips E and F have equidistant notches $e$ and $f$ formed in them throughout their length to receive the blades. The notches $e$ and $f$ of the strips E and F are exactly opposite to each other, so that the blades may rest on the side bars at right angles to their length.

G is a removable bottom board resting on the cross-bars C between the bars A and B. The board G is preferably provided with two metal strips $g$, secured in the board with edge up, as shown.

The tops of the strips E, F, and $g$ are preferably very narrow or knife-edged, so as not to afford any surface for the paste on the material to adhere to.

When the blades are inserted in position in the notches $e$ and $f$, the material with the paste underneath is placed on the top of the blades, the top portions of the thumb-screws D forming guides for the placing of the material properly. The material is then rubbed by the operator with a cloth, so as to make the blades adhere thereto, and the material and blades momentarily assume during this operation the position shown in Fig. 3. When the material has been caused to adhere to the blades, the supplemental board H is placed on the top of the material, and both boards at each end may then be grasped by the operator and removed from between the side bars, turned over, and placed in the position shown in Fig. 5, with the removable board G on top. By this means the blades and material are so securely held in between the removable board G and supplemental board H when they are being removed that there will be no chance of the blades getting out of place on the material.

When the material is removed, as shown in Fig. 5, the removable board G may be replaced in the position shown in Fig. 1 and the supplemental board H withdrawn from beneath the material, and another sheet or layer of material or covering suitably pasted may be placed on the top of the covering and blades and caused to adhere thereto by rubbing with a cloth or in any other suitable manner.

From this description it will be seen that I have provided a simple machine in which the blades may be securely fastened to the material without any danger of the material sticking to the machine, and this I accomplish on account of the minimum of surface against which the material is placed during the operation. It will also be seen that the material may easily be accurately placed, the blades will remain in proper position, and that the machine may be readily adjusted to accommodate different lengths of blades or widths of material.

What I claim as my invention is—

1. In combination, the side bars A B, having back stops and notches to receive the strips or blades, and the cross-bars C, adjustably connecting the side bars to accommodate different lengths of blades, substantially as described.

2. The combination of the side bars A and B, back stops $a$ and $b$, knife-edged metal strips E and F, having equidistant notches $e$ and $f$ throughout their entire length and opposite to each other, so as to parallelly receive a series of blades, the cross-bar C, connecting the side bars, and the removable board G, arranged as and for the purpose specified.

3. The combination of the side bars A and B, back stops $a$ and $b$, knife-edged metal strips E and F, having equidistant notches $e$ and $f$ throughout their entire length and opposite to each other, so as to parallelly receive a series of blades, the cross-bars C, connecting the side bars, and the removable board G, having knife-edge metal strips $g$ extending throughout its length, as and for the purpose specified.

4. The combination of the side bars A and B, back stops $a$ and $b$, knife-edged metal strips E and F, having equidistant notches $e$ and $f$ throughout their entire length and opposite to each other, so as to parallelly receive a series of blades, the cross-bars C, connecting the side bars, the removable board G, having knife-edge metal strips $g$ extending throughout its length, and the supplemental board H, arranged as and for the purpose specified.

FREDERICK CROMPTON.

Witnesses:
LEWIS P. ABELL,
A. B. MONKHOUSE.